3,295,912
LIGHT DEFLECTION DEVICE
Harold Fleisher, Eugene Shapiro, and Thomas J. Harris, Poughkeepsie, N.Y., assignors to International Business Machines Corporation, New York, N.Y., a corporation of New York
Filed May 20, 1963, Ser. No. 281,622
6 Claims. (Cl. 350—150)

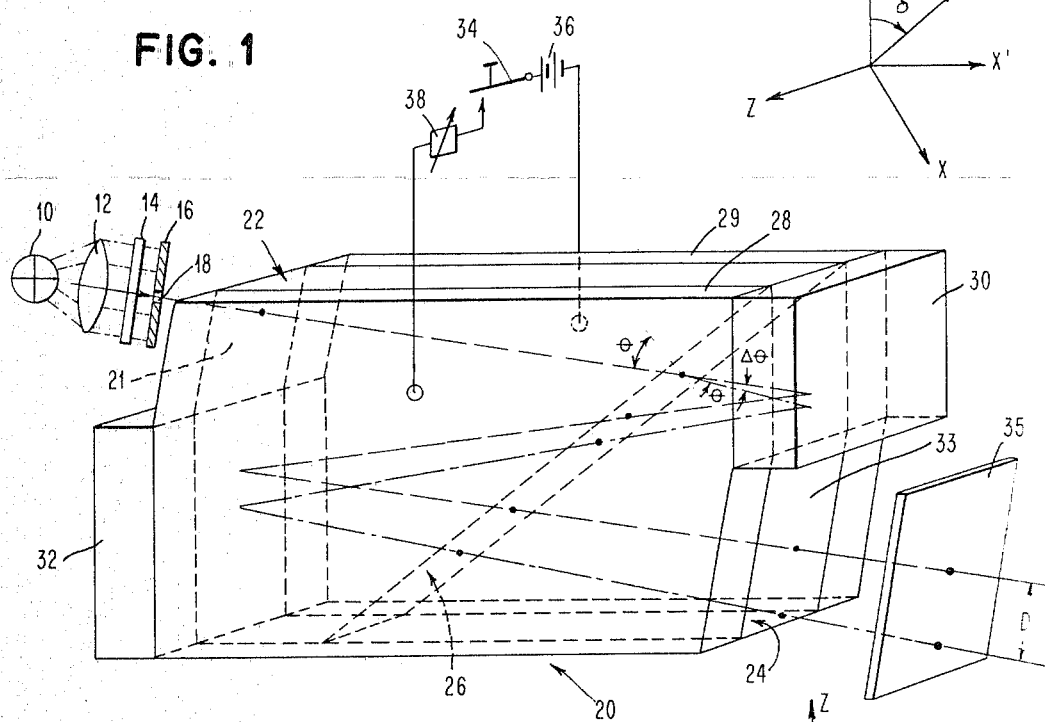
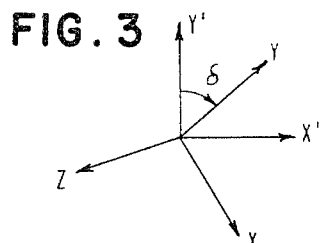
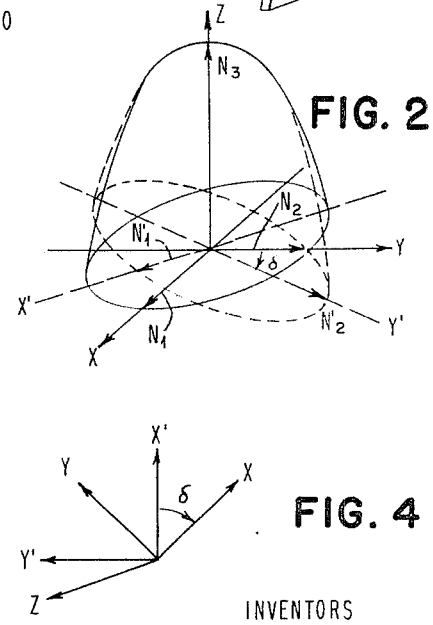
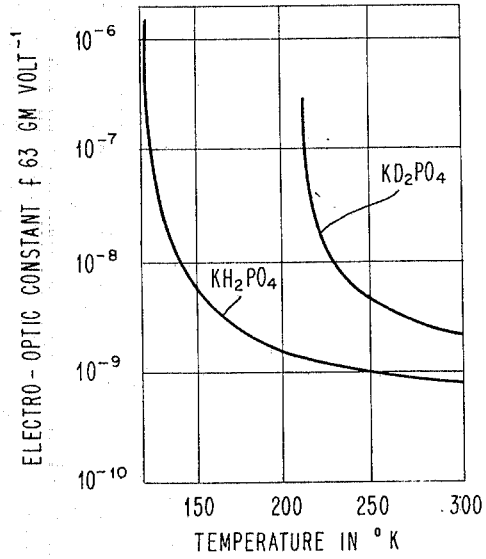
INVENTORS
HAROLD FLEISHER
THOMAS J. HARRIS
EUGENE SHAPIRO
BY George O. Saile
ATTORNEY United States Patent Office 3,295,912
Patented Jan. 3, 1967

The present invention relates to a light deflection device and, more particularly, to a device for deflecting a beam of light by using an optically transparent electro-optic medium whose refractive index changes with the application of an electric field.

Electro-optic light deflecting devices have been known to the prior art. Light beams have been deflected by means of a change in the optical properties of a medium through which the light is being passed. Crystalline, liquid and gaseous mediums have been used in a variety of light deflecting devices. These devices have had, however, little application because of their size requirements necessary to give an adequate and useful displacement of the light beam from one extreme to the other.

It is thus an object of the present invention to provide an improved light deflection device small in size yet capable of a useful light beam displacement.

It is another object of this invention to provide an improved light deflection device that uses electro-optic materials wherein the operation of the light deflector is of extremely high speed.

It is a further object of this invention to provide an improved light deflection device which is simple in structure and inexpensive to construct.

These and other objects are accomplished according to the broad aspects of the present invention by providing an electro-optic light deflector composed of a light transparent body. The light transparent body is composed of two distinct electro-optic mediums each of which has an electric field dependent index of refraction. The monochromatic light beam to be deflected is passed through the light transparent body a large number of times. An electric field is applied to the body in an amount proportional to the deflection of the light beam desired. Each time the light beam passes through the boundary between the two electro-optic mediums an increment of deflection is accomplished. The light beam is passed through the boundary between the two electro-optic mediums at least one time and preferably a large number of times. The total amount of deflection of the light beam is equal to the number of passages of the light beam through the boundary times the increment of deflection accomplished in each passage.

The light deflection device of the present invention is thus seen to be very compact. A sizable displacement of the light beam is possible, however, because of the novel structure which allows the same pair of distinct electro-optic mediums to refract the light beam a large number of times. The path length of the beam within the device is also multiplied due to the structure of the invention.

The foregoing and other objects, features and advantages of the present invention will be apparent from the following more particular description of the preferred embodiment of the present invention, as illustrated in the accompanying drawings.

In the drawings:
FIGURE 1 is a schematic greatly enlarged illustration of the preferred embodiment of the electro-optical light deflector device of the present invention;
FIGURE 2 is a graphical representation of the optical properties of an electro-optic crystalline material;
FIGURE 3 shows the main axes of the electrically deformed index ellipsoid of the first electro-optic medium in the FIGURE 1 embodiment ($x'$, $y'$, $z$ system);
FIGURE 4 shows the main axes of the electrically deformed index ellipsoid of the second electro-optic medium in the FIGURE 1 embodiment ($x'$, $y'$, $z$ system); and
FIGURE 5 is a graphical representation showing how the electro-optic constant $f_{63}$ of potassium dihydrogen phosphate ($2H_2PO_4$) and potassium deuterium phosphate ($KD_2PO_4$) vary with temperature.

Referring now, more particularly, to FIGURE 1 there is shown a monocromatic light source 10 which is, for example, a continuous wave (CW) laser. The light source 10 produces a beam which is directed through a collimating lens 12. The now collimated beam passes through a light polarizer 14 which, for the purpose of example, polarizes the light beam in the $y'$ direction. The direction of polarization could, of course, be in another direction depending upon the alignment of the electro-optic medium into which the polarized light beam is to pass. The monochromatic, collimated, and polarized beam is directed against the plate 16 and a portion of the beam passes through the aperture 18 in the plate 16. The portion of the light beam passing through the aperture 18 and through the deflecting device 20 is represented simply by a dashed line.

The electro-optical light deflecting device 20 includes a light transparent body having two distinct electro-optic mediums 22 and 24 with boundary area 26 between the mediums. These mediums, which are preferably crystalline, have the characteristic that their refractive indices change in opposite directions with the application of an electric field. Typical materials displaying this electro-optic effect are, for example, potassium dihydrogen phosphate, potassium dideuterium phosphate, ammonium dihydrogen phosphate and barium titanate. The crystals are cut preferably of approximately equal size and cemented together to form a substantially rectilinear body.

The optical properties of electro-optical crystalline mediums 22 and 24 can be completely described by assigning three mutually perpendicular characterstic directions, $x$, $y$, and $z$ are three corresponding constants $N_1$, $N_2$, $N_3$ called the principal indices of refraction. This information can be represented graphically by constructing an ellipsoid, as shown in FIGURE 2, whose three semiaxes are parallel to $x$, $y$, and $z$ and which have lengths equal to $N_1$, $N_2$ and $N_3$, respectively. Given the direction of light propagation, it is possible to then construct a plane perpendicular to this direction (i.e., parallel to the corresponding electric vibrations) and passing through the center of the ellipsoid. The intersection of this plane with the ellipsoid will in general be an ellipse. The principal axes of this ellipse are possible oscillation directions of the electric displacement vector of the incident light. The lengths of the semiaxes are numerically equal to the corresponding indices of refraction.

For example, consider light propagating along the $x$ axis in FIGURE 2. Each arbitrary electric displacement vector can be decomposed into components parallel to the $y$ and $z$ axes. The component parallel to the $y$ axis will propagate with a velocity proportional to $N_2$, and the components parallel to the $z$ axis will propagate with a velocity proportional to $N_3$. The application of an electric field to an electro-optic crystal causes changes in the crystal which either lead to a deformation of the index ellipsoid or to an inclination of its axes or both. If we consider a specific electro-optic crystal, such as potassium dihydrogen phosphate ($KH_2PO_4$), where $N_1=N_2\neq N_3$, the resulting surface will be an ellipsoid of revolution. This surface is indicated by the solid lines in FIGURE 2. Light propagating with a ray direction in the $xy$ plane will encounter indices of refraction $N_1=N_2$, and $N_3$. When an electric field is applied to the crystal along the $z$ axis, $N_1 \neq N_2$ and a general ellipsoid is generated. This is indicated by the dotted lines in FIGURE 2. The eccentricity of the ellipsoid in the case of potassium dihydrogen phosphate is dependent upon the electric potential applied. There is a 45° angular change $\delta$ in the $x$ and $y$ axes due to the electric field. The angular change is constant for all applied potentials for this particular material.

The principal indices of the electrically deformed Fresnel ellipsoid ($N_1'$, $N_2'$, $N_3$), when the electric field is applied along the $z$ axis of the crystals, are represented by the $x'$, $y'$, $z$ coordinate systems. The indices of refraction $N_1'$ and $N_2'$ of the crystals 22 and 24 change in opposite directions. The crystals 22 and 24 have their principal indices of refraction ($N_1$, $N_2$, $N_3$) oriented, for example, as shown by the $x$, $y$, $z$ coordinate systems in FIGURES 3 and 4. Light propagating with a ray direction in the $xy$ plane does not see the index of refraction for the component in the $z$ direction. However, the index of refraction for the components in the $xy$ plane will vary with the ray direction. The index of refraction for light linearly polarized in the $y'$ direction and propagating along the $x'$ axis will be $N_2'$. The index of refraction for light linearly polarized along the $x'$ direction and propagating in the $y'$ direction will be $N_1'$.

The electric field is applied to the transparent body along the $z$ axes of electro-optic mediums 22 and 24 by means of a pair of electrodes 28 and 29 disposed so as to contain the transparent body. These electrodes may be applied by conventional coating techniques to the opposite surfaces of the transparent body parallel to the incoming light beam. The composition of the electrodes may be of any suitable conductive material such as platinum or gold.

Dielectric reflective surfaces 30 and 32 are applied to other opposite sides of the transparent body to intercept and reflect the light beam through the transparent body a plurality of times. One of the reflective coatings is applied to a surface of each of the two electro-optic mediums so that the light beam will be preferably reflected through the boundary layer 26 between the two electro-optic crystals 22 and 24 once for each light reflection. A light admitting surface 21 is shown above the reflective surface 32. A light emitting surface 33 is shown below the reflecting surface 30. Other arrangements for these light admitting and emitting surfaces, and the reflecting surfaces are, of course, possible. The reflective coatings should either be composed of a dielectric material or have an insulator between themselves and the conductive electrodes 28 and 29 to prevent shorting of the applied voltage between the conductive electrodes.

The polarized light beam may obtain components of elliptically polarized light while making its multiple reflective path through the deflecting device 20. These components may be conveniently eliminated by positioning a second light polarizer 35 in the path of the output light beam. The light polarizer 35 is aligned with the polarizer 14 and placed parallel to the light emitting surface 33.

One possible circuit means for applying a variable voltage to the electrodes 28 and 29 includes a switch 34 serially connected to a voltage source 36 and a means 38 for varying or regulating the voltage between the electrodes 28 and 29. The means 38 for varying or regulating the voltage between the electrodes may be of any conventionally designed electronic switch which will operate at high speeds.

In the operation of the illustrated embodiment of the invention given in FIGURE 1, the monochromatic light source 10 is turned on. The light beam from the source 10 is collimated by collimating lens 12 and linearly polarized in the $y'$ direction in polarizer 14. A narrow beam of this collimated and polarized light passes through the aperture 18 in plate 16 and is applied therefrom to the light admitting surface 21 of the first electro-optic crystal 22 of the transparent body.

The light beam progresses through the transparent body along the dashed path for the condition of the no-electric field applied along the $z$ axes of the electro-optic crystals 22 and 24. The beam passes through the first electro-optic crystal 22 until it reaches the boundary 26 between the first and second electro-optic mediums. At the boundary 26, the light beam is not refracted since the refractive indices of the electro-optic crystals 22 and 24 are the same for the no-electric field condition. The light beam passes through the second electro-optic medium 24 until it is reflected by reflective coating 30. The reflected beam passes back through the second electro-optic medium 24 until it again passes the boundary 26 between the two mediums. Here again, the light beam is not refracted. The light beam continues through the first electro-optic medium 22 until it is reflected from reflective coating 32. The light beam continues to be reflected back and forth through the boundary 26 of the two electro-optic mediums until it reaches the emitting surface of the second electro-optic medium 24. The drawing illustrates only two reflections off reflective coatings 30 and 32 as a means for simplifying the illustration. It is, however, obvious that a great many more reflections and the corresponding passages through the boundary 26 are possible.

If the switch 34 is closed, the means 38 for varying the voltage between electrodes 28 and 29 is actuated and an electric field is produced between the electrodes. The index of refraction of the crystals 22 and 24 is thereby immediately changed in opposite directions. The magnitude of the voltage, the corresponding magnitude of the electric field and resulting change in index of refraction in the transparent body are determined by the means 38 for varying the voltage. Now when the light beam passes through the boundary layer 26 between the two electro-optic crystals, a small change $\Delta\theta$ in the refraction of the light beam occurs in the direction of the propagation of the beam. After reflection, the light beam again is refracted in the same direction when going from the crystal 24 to the crystal 22. Thus, each crossing of the boundary 26 adds a small light beam deflection change $\Delta\theta$ in the direction of the propagation of the beam. The total angular deflection equals the number of crossings N of the boundary 26 times the angle of deflection $\Delta\theta$ of the light beam at each crossing. Further, the passage of the light beam back and forth between reflective surfaces 30 and 32 simultaneously lengthens the path length of the light beam which has the effect of increasing the linear deflection or displacement D of the light beam. The light beam displacement D indicated in FIGURE 1 is the maximum displacement when a voltage of one polarity is applied to electrodes 28 and 29. When an opposite polarity voltage is applied, the light beam is deflected a distance above the no-electric field applied condition represented by the dashed line. The total possible linear deflection or displacement then is twice the displacement D illustrated in FIGURE 1.

The light beam deflection effect of the light deflection device of the present invention may be expressed mathematically. Polarized monochromatic light passes the admitting surface 21 preferably normal thereto. The light continues through crystal 22 and strikes the boundary 26 at an angle of $\theta_1$ degrees. The light enters the crystal 24 at an angle of incidence $\theta_1$ degrees. An electric field applied along the z axis of the crystals, as shown by reviewing FIGURES 1, 2, 3 and 4, will induce a small change in the index of refraction $\Delta n$ from the crystal's normal index of refraction $n$ along the $x'$ and $y'$ axes. The angle of refraction of the incident polarized light beam will subsequently change by an amount $\Delta\theta$ which is given by:

$$\Delta\theta = \frac{\Delta n}{n}\tan\theta_1$$

Due to the different orientation of the crystals 22 and 24, the indices of refraction change in opposite directions and $\Delta\theta$ becomes:

$$\Delta\theta = 2\frac{\Delta n}{n}\tan\theta_1$$

The value of $\Delta n$ may be determined from the relationship:

$$\Delta n = \tfrac{1}{2}(n)^3 f_{63} E_Z$$

where $E_Z$ is the applied field strength, $f_{63}$ is the electro-optic constant of the crystal, and $n$ the index of refraction without an applied electric field. After determining the angular deflection $\Delta\theta$ for one passage through boundary 26, the total angular deflection $\Delta\theta_T$ may be determined for N passages through the boundary by:

$$\Delta\theta_T = N\Delta\theta$$

The calculation of the total linear displacement $D_T$ of the light beam is given the expression:

$$D_T = N(d)(\Delta\theta_T)$$

where $d$ is the distance between reflectors 30 and 32 in the transparent body, and the reversal of the field polarity is included.

The temperature of the electro-optic crystals in the light deflection device must be controlled so as to maintain the stability of the deflection angle and the linear displacement of the light beam. The curves for the electro-optic constants $f_{63}$ of potassium dihydrogen phosphate (KH$_2$PO$_4$)

and potassium deuterium phosphate (KD$_2$PO$_4$) shown in FIGURE 5 are typical of ferroelectric crystals operated above their Curie temperature. The sensitivity of the electro-optic constant $f_{63}$ can be expressed as:

$$\frac{\Delta f_{63}}{f_{63}} = \frac{\Delta T}{T - T_c}$$

where $T_c$ is the Curie temperature of the crystal. For example, using a KD$_2$PO$_4$ crystal, to have a $\pm 0.1\%$ stability in the constant $f_{63}$ at room temperature operation, the temperature of the crystal during operation must be held to approximately $0.1°$ K. of the chosen temperature. An increase in the electro-optic constant $f_{63}$ by a factor of 10 is made, as shown by FIGURE 5, if KD$_2$PO$_4$ crystals were operated when cooled to within $10°$ K. of the Curie temperature, or KH$_2$PO$_4$ crystals were operated when cooled to $15°$ K. above its Curie temperature. The cost of this increase is an even closer temperature control to maintain the stability of operation. The temperature must be controlled to approximately $\pm 0.01°$ K. However, the additional effort needed to control the temperature to approximately $\pm 0.01°$ K. rather than $\pm 0.1°$ K. is very slight. The improved operation of the crystal by a factor of 10 makes the effort worthwhile. Cooling can, for example, be accomplished by submerging the crystal structure in a temperature controlled transparent liquid such as certain types of mineral or silicone oils and fluorinated hydrocarbons.

The following is a detailed example of the present light deflection device wherein the crystals 22 and 24 are composed of potassium dihydrogen phosphate (KH$_2$PO$_4$). The device is held at room temperature of $293 \pm 0.1°$ K. The following typical values are taken:

$\theta_1 = 45°$
$E_Z = 10^5$ volt/cm.
$n = 1.51$
$d = 1$ cm.
$f_{63} = 10^{-9}$
$k = .04$ cm.$^{-1}$ The value of $\Delta n$ may be calculated from $$\Delta n = \tfrac{1}{2}(n)^3 f_{63} E_Z$$

we have $\Delta n = (\tfrac{1}{2})(1.51)^3(10^{-9})(10^5)$ $$\Delta n = 1.71 \times 10^{-4}$$

The small angular deflection $\Delta\theta$ then may be calculated:

$$\Delta\theta = \frac{2(1.71 \times 10^{-4})(1)}{1.51}$$

$$\Delta\theta = 2.26 \times 10^{-4} \text{ radians}$$

$$\Delta\theta = 2.26 \times 10^{-4} \text{ radians}$$

The total angular deflection for N crossings is then where N is, for example, 14:

$$\Delta\theta_T = N\Delta\theta$$

$$\Delta\theta_T = 14 \times 2.26 \times 10^{-4}$$

$$\Delta\theta_T = 3.17 \times 10^{-3} \text{ radians}$$

Cooling the crystal to $140 \pm 0.015°$ K. achieves an improvement by a factor of 10 which gives:

$$\Delta\theta_T = 3.17 \times 10^{-2} \text{ radians}$$

or $$\Delta\theta_T = 1.8 \text{ degrees}$$

By reversing the polarity of the voltage, the beam can be reversed in the opposite direction, hence:

$$\Delta\theta_T = \pm 1.8°$$

for a $3.6°$ total angular deflection. The calculation of the displacement D of the beam at the emitting surface 33 is given approximately by:

$$D = \frac{N(d)}{2}(\Delta\theta_T)$$

$$D = 14(\tfrac{1}{2})(3.17 \times 10^{-2})$$

$$D = 0.22 \text{ cm.}$$

Reversal of the polarity of the field applied allows a similar displacement in the opposite direction for a total linear displacement $D_T$ of 0.44 centimeter. The optical loss may be determined from:

$$I_{out} = I_{in} e^{(-k)Nd}$$
$$I_{out} = I_{in} e^{(-.04)(14)(1)}$$
$$I_{out} = \frac{I_{in}}{1.75}$$

where $k$ is the absorption coefficient of the crystals and $N \cdot d$ is the total path length traveled by the light beam in the crystal. The output then would be 570 milliwatts for a one watt input.

It is therefore seen from the above example that a substantial angular deflection of the light beam by 3.6 degrees and a linear displacement of 0.44 centimeter is readily possible. The light loss due to the light absorption by the crystal is in a workable range. These light beam deflection values are especially significant when considerering that the deflection device is in size of the order of one-half cubic centimeter. Also, the switching speed from one deflection angle to another may be accomplished in approximately $10^{-6}$ to $10^{-8}$ seconds.

The light deflection device may be utilized, for example, to direct the light beam emerging from an optical maser at almost instantaneous speeds for optical memory scanning, optical pulse position modulation and writing on a thermoplastic medium. A technique for writing on a thermoplastic medium is the subject of a patent application Serial No. 277,233, filed May 1, 1963, now Patent No. 3,262,122 by H. Fleisher, T. J. Harris and E. Shapiro and assigned to the same assignee as the present invention. Further, the combination of an electro-optic light AM modulator, the novel electro-optic light deflector of the present invention, and a light source, such as a laser, would make possible a device to replace cathode ray tubes in television or other display systems.

The collimating lens 12 may be replaced with a lens for slightly converging the light beam. The lens could be designed to focus the light through the deflection device and onto, for example, a thermoplastic medium for the writing purposes suggested in the above paragraph. This combination of structure has the effect of increasing the intensity of the light beam at the point desired while simultaneously controlling the position of the light beam.

The monochromatic light beam source used does not limit the present light deflection device. While continuous wave laser light sources are readily available today and are convenient sources of monochromatic light, other types of light sources are available. Carbon or mercury arc light sources can be used in conjunction with appropriate filters to provide monochromatic light beams.

While this invention has been particularly shown and is described with reference to the preferred embodiment thereof, it will be understood by those skilled in the art that the foregoing and other changes in form and details may be made therein without departing from the spirit and scope of the invention.

What is claimed is:

1. An electro-optical light deflector for deflecting a monochromatic light beam comprising:
   a light transparent body composed of two distinct electro-optic mediums closely adjacent to each other along a boundary, each having an electric field dependent index of refraction;
   means for passing said light beam back and forth through said body across said boundary a plurality of times;
   and means for applying an electric field in said body to change the index of refraction of at least one of said mediums, thereby to deflect said light beam by an amount proportional to the field applied as the said light beam passes through the boundary between said electro-optic mediums.

2. An electro-optical light deflector for deflecting a monochromatic light beam comprising:
   a light transparent body composed of two electro-optic crystals closely adjacent to each other along a boundary, each having an electric field dependent index of refraction;
   said crystals having their main axes of the index ellipsoid so positioned in respect to one another that their indices of refraction change in opposite directions when an electric field is applied to said body;
   means for passing said light beam back and forth through said body across the boundary between said crystals a plurality of times;
   and means for applying an electric field in said body to change the respective indices of refraction of said crystals in opposite directions, thereby to deflect said light beam by an amount proportional to the field applied each time the said light beam passes through the boundary between said electro-optic crystals.

3. An electro-optical light deflector for deflecting a monochromatic light beam comprising:
   a light transparent body composed of two electro-optic crystals closely adjacent to each other along a boundary, each having an electric field dependent index of refraction;
   said crystals having their main axes of the index ellipsoid so positioned in respect to one another that their indices of refraction change in opposite directions when an electric field is applied to said body;
   a pair of surfaces on said body for reflecting said light beam back and forth through said body across the boundary between said crystals a plurality of times;
   a pair of electrodes disposed so as to contain said body;
   and means for applying a variable voltage to said electrodes for thereby changing the respective indices of refraction of said crystals in opposite directions.

4. An electro-optical light deflector for deflecting a monochromatic light beam comprising:
   a light transparent body composed of two electro-optic crystals closely adjacent to each other along a boundary, each having an electric field dependent index of refraction;
   a surface of said body for admitting said light beam;
   a pair of surfaces on said body having coatings thereon of a light reflecting material for reflecting said light beam back and forth through said body across said boundary a plurality of times;
   a surface of said body for emitting said light beam;
   and means for applying an electric field in said body to change the index of refraction of at least one of said crystals, thereby to deflect said light beam by an amount proportional to the field applied each time the said light beam passes through the boundary between said electro-optic crystals.

5. An electro-optical light deflector for deflecting a monochromatic light beam comprising:
   a light transparent body composed of two electro-optic crystals closely adjacent to each other along a boundary each having an electric field dependent index of refraction;
   said crystals having their main axes of the index ellopsoid so positioned in respect to one another that their indices of refraction change in opposite directions when an electric field is applied to said body;
   a surface of said body for admitting said light beam;
   a pair of surfaces on said body having coatings thereon of a light reflecting material for reflecting said light beam back and forth through said body across the boundary between said crystals a plurality of times;
   a surface of said body for emitting said light beam;
   and means for applying an electric field to said body to change the respective indices of refraction of said crystals in opposite directions, thereby to deflect said light beam by an amount proportional to the field applied.

6. An electro-optical light deflector for deflecting a monochromatic light beam comprising:
   a light transparent body composed of two electro-optic crystals closely adjacent to each other along a boundary each having an electric field dependent index of refraction;
   said crystals having their main axes of the index ellipsoid so positioned in respect to one another that their indices of refraction change in opposite directions when an electric field is applied to said body;
   a surface of said body for admitting said light beam;
   a pair of surfaces on said body having coatings thereon of a light reflecting material for reflecting said light beam back and forth through said body across the boundary between said crystals a plurality of times;
a surface of said body for emitting said light beam;
a pair of electrodes disposed so as to contain said body;
and means for applying a variable voltage to said electrodes to change the respective indices of refraction of said crystals in opposite directions, thereby to deflect said light beam by an amount proportional to the voltage applied each time it passes through the boundary between said crystals.

References Cited by the Applicant

UNITED STATES PATENTS 1,923,891   8/1933   Skaupy.

JEWELL H. PEDERSEN, *Primary Examiner.*

R. L. WIBERT, *Assistant Examiner.*